Oct. 26, 1937.  J. D. WALKER  2,097,111
ROTARY DISTRIBUTOR
Filed Oct. 15, 1934  2 Sheets-Sheet 2
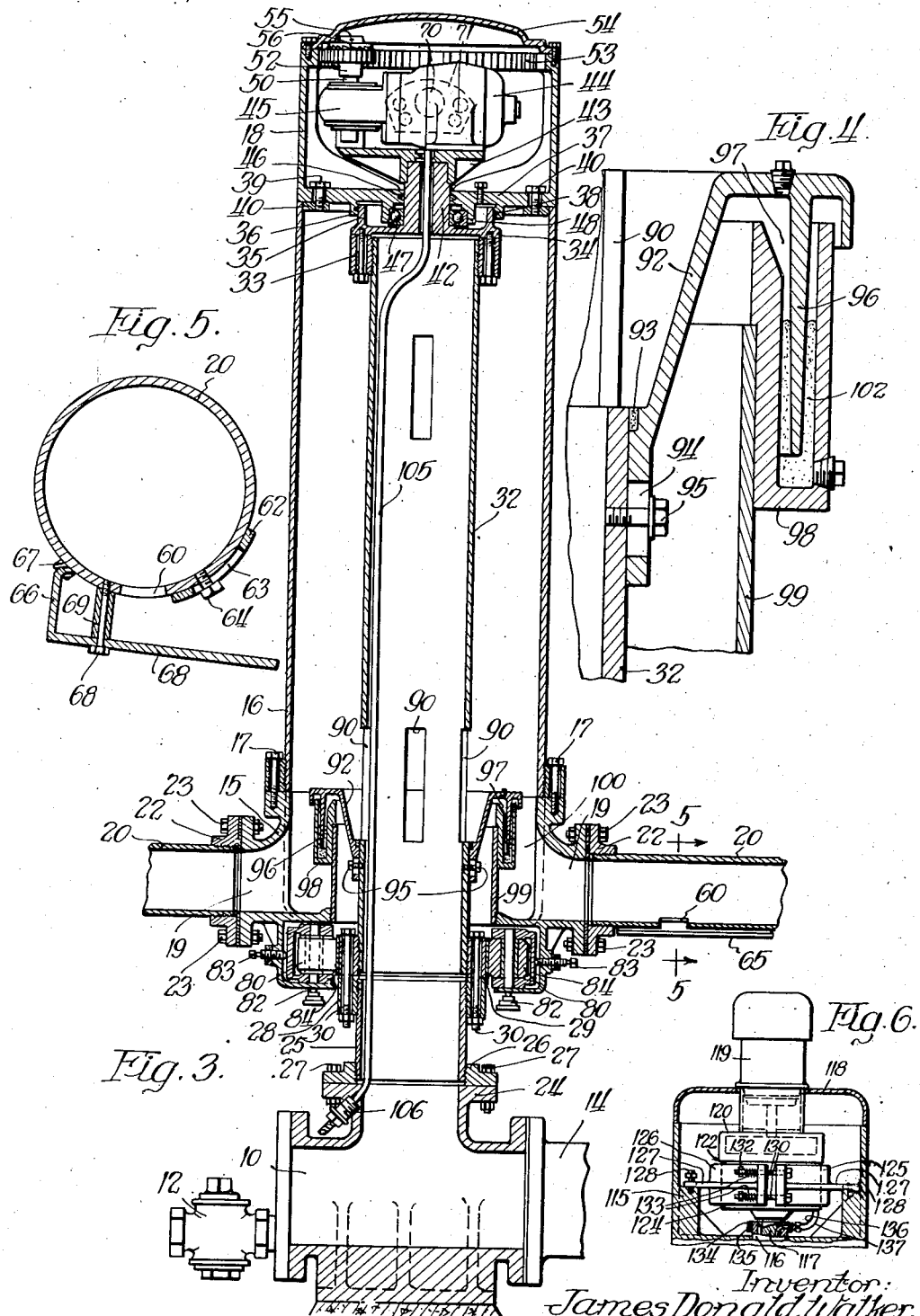
Inventor:
James Donald Walker.
By Mason, Jackson, Boettcher-Drennan
Attys.

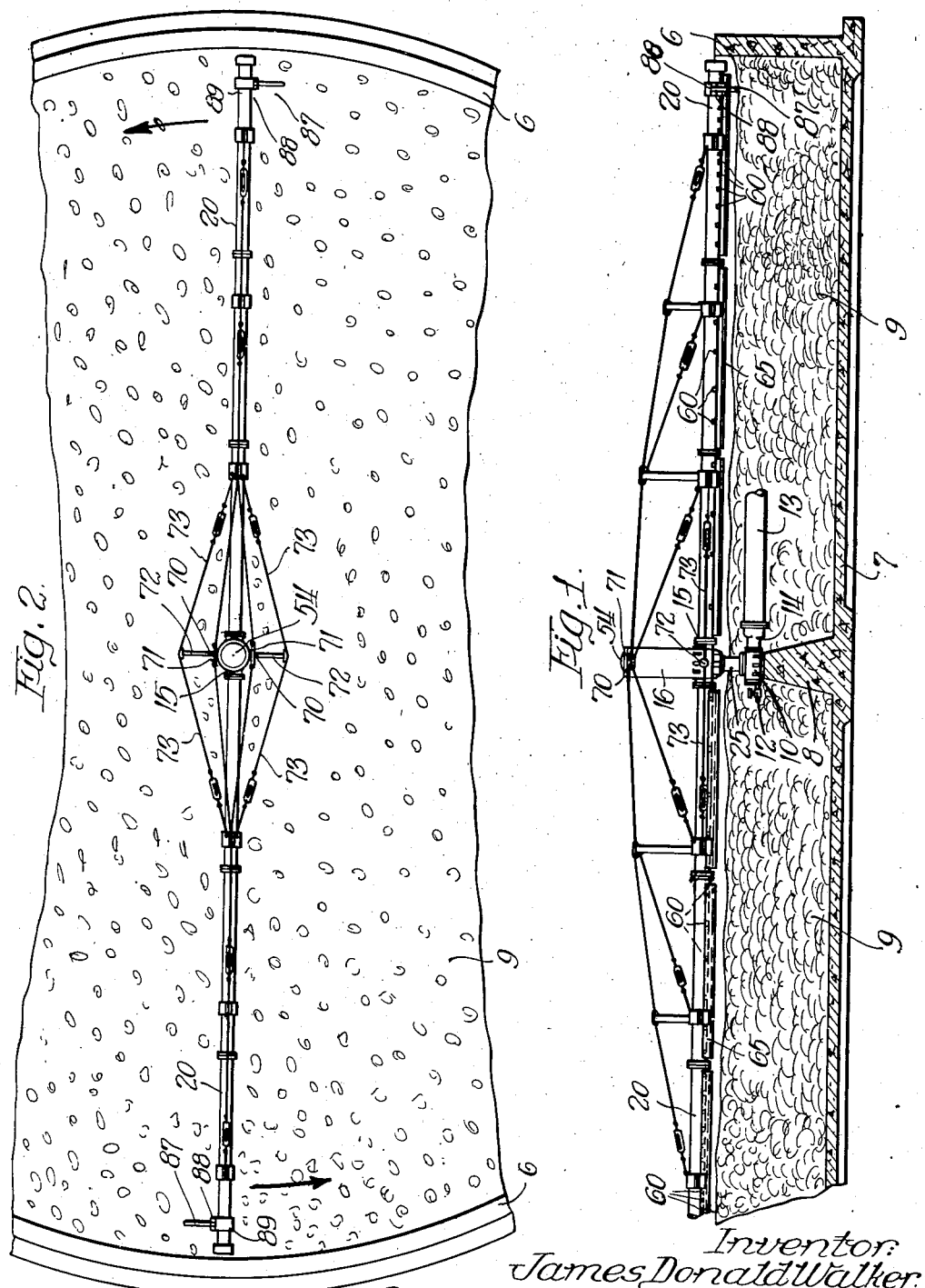

Patented Oct. 26, 1937

2,097,111

UNITED STATES PATENT OFFICE 2,097,111

ROTARY DISTRIBUTOR

James Donald Walker, Aurora, Ill., assignor, by mesne assignments, to The American Well Works, Aurora, Ill., a corporation of Illinois Application October 15, 1934, Serial No. 748,285

16 Claims. (Cl. 210—7)

This invention relates to rotary distributors and more particularly to rotary distributors employed for spreading liquor uniformly over a circular trickling filter bed.

In the development of sewage disposal plants, one type of disposal system comprises the distributing of sewage in a substantially uniform sheet over the area of a filter bed. The sewage, as it trickles through the interstices in the filter medium, is acted upon by biological life or bacteria which form a surface or film over the individual filter particles, and the sewage emerges from the bottom of the filter bed in a stabilized and oxidized condition.

Distributors of the type now in use with which I am familiar are almost entirely of the reaction type, that is, the reaction of the liquor emerging from orifices or jets in the distributor arms produces rotation of the distributor. This necessarily requires a dosing tank to store up sufficient liquor so that when it is introduced into the distributor, it will, upon emergence from the jets or orifices, produce a sufficient reaction impulse to effect rotation of the distributor. The operation of such a distributor is intermittent, and is dependent upon the head and volume of the liquor at the distributor. Further, appurtenant dosing tanks and pumps are necessary for its operation, and it is inherently unsatisfactory in that it may concentrate flow of sewage over only a restricted portion of the bed if the reaction discharge is not sufficient to rotate the distributor arm.

A further objection to the use of such types of distributors arises from the fact that the area of the jet or orifice in the distributor arm must be kept quite small to produce a sufficient reaction impulse, and consequently clogging and stoppage of flow occurs due to solid particles in the sewage. Further, these jets or orifices must be directed laterally outwardly of the arm, and consequently are not self-draining, and are not self-flushing.

The present invention provides a positively rotated distributor, driven by a fractional horsepower motor having a built-in reduction gear to produce a slow-speed uniform rotation of the distributor arms. The gearing is provided with a dog tooth clutching member, to prevent damage to the reduction gearing if reverse rotation of the distributor should inadvertently occur due to wind or other force when the motor is stopped.

A primary object of the present invention is to provide a distributor which is uniformly rotated over the circular filter bed, and which is capable of distributing liquor uniformly thereover without requiring appurtenant dosing tanks or pumps. Further, the present invention provides a distributor which can take care of any flows that come to the plant, the operation of the distributor being independent of the head and volume at the distributor, and therefore producing a distributor which may operate on a very minimum head or flow.

In this connection, the present distributor is so designed that after it has once started rotating, the drive unit has only to overcome the friction losses in the liberally designed ball bearing upon which the distributor is mounted with respect to its central supporting member, and these friction losses require relatively little power consumption.

Another object of the present invention is to provide distributor arms which are capable of distributing the sewage over the filter bed in a uniform sheet over the entire area of the stone or other filter medium so that most efficient use of the stone from the surface on down is made. In order to overcome the defects which occur in the reaction type of distributor arms, I have provided, in the present invention, arms made of steel tubing with wide non-clogging slots milled in the bottom through which the sewage discharges. Directly below these slots I provide a splash plate which spreads the discharge from the slots into a wide thin film which drops onto the filter bed. These films are overlapping in the area covered by the distributor arms so that complete and uniform distribution is provided. It is apparent that by the provision of the holes at the bottom of the distributor arms the arms are self-draining and self-flushing.

Another feature of the present invention is the provision of a free wheeling drive between the speed-reducing gearing and the distributor, whereby possible interruptions of power will prevent the reverse rotation of the distributor from imposing any strains upon the gearing.

By the use of splash plates for distribution, it is possible to spread the sewage uniformly over the entire area of the bed. In this manner, full advantage may be taken of the filter media, which comprises relatively expensive selected stone of substantially uniform size, so that the filter medium is affected from the upper surface down to the bottom of the filter bed. This produces two distinct advantages, namely, a better effluent for a given bed depth, and the use of a lesser bed depth than is required in the case where sewage is applied in a non-uniform sheet.

Also, by the use of this type of distributor, with uniform distribution, there is less "sewage fly" breeding, since the entire surface of the filter bed is kept wetted.

A further advantage provided by the present invention is the provision of means for preventing short circuiting of the filter bed. This is provided by sealing means interposed between the feed pipe and the supporting collar for the distributor at the lower portion of the distributor housing, whereby no sewage can leak from the feed pipe directly downwardly past the supporting column into the filter bed, producing a concentrated dosing of sewage adjacent the supporting column for the distributor, and consequently not efficiently oxidizing and stabilizing the sewage liquor before it reaches the bottom of the bed.

I have found that because of the relatively large mass and weight of rotary distributors of this type, whereby the ordinary types of distributors have relative high static and kinetic inertias, considerable difficulty has been experienced in providing a driving mechanism, of economical design and requiring only a small operating power supply, that will be effective to overcome the initial static inertia of the distributor when the motor is started. Also, due to the weight of the distributor, there is a tendency, when the motor is stopped, for the distributor to continue its rotary movement, resulting in overstressing and possible breakdown of the driving connections between the rotatable drum of the distributor and the driving motor, with consequent whipping of the distributor arms which may result in entire disablement of the gears or shafting.

In order to overcome these disadvantages, I have devised a driving structure wherein the rate of acceleration of the distributor may be controlled in order to increase the time interval before predetermined speed is reached so that the maximum torque may be provided with minimum stress on the structure. In the same manner, the rate of deceleration is decreased to lengthen the time interval for stopping rotation, preventing undue stress on the driving connection. By this means I am able to provide a relatively small initial starting torque upon the distributor without overstressing the driving means, and by gradually bringing the distributor up to a predetermined speed by means of a variable ratio drive, no overstressing of the driving mechanism is produced. This is of distinct advantage in enabling starting and stopping of the distributor without overstressing or disablement of the shafting and driving means and without any tendency for the motor to stall. In addition, by reason of this arrangement, I am able to employ driving means having a relatively small power supply, whereby an economically operating rotary distributor may be produced at small cost in accordance with the teachings of this invention.

Another feature of the present invention is the provision of a distributor of this type which is relatively compact in design, and is pleasing in appearance, while yet providing the requisite strength and rigidity for a structure of this type. In this connection, the power supply means for the drive motor is led through the filter bed and supporting column within a submarine cable.

Other objects and advantages of the present invention will appear more fully from the following detailed description, which, taken in conjunction with the accompanying drawings, will disclose to those skilled in the art the particular construction and operation of a preferred form of the invention.

In the drawings:

Figure 1 is a side elevational view of a rotary distributor mounted in position over a trickling filter bed;

Figure 2 is a plan view of the distributor shown in Figure 1;

Figure 3 is a vertical sectional view taken centrally through the distributor and its supporting column;

Figure 4 is an enlarged vertical sectional view of the seal provided between the overflow flange and the distributor manifold well;

Figure 5 is a sectional view through one of the distributor arms, taken substantially on the line 5—5 of Figure 3; and Figure 6 is a diagrammatic view, partly in section, of a modified type of driving means.

Referring now in detail to the drawings, in Figure 1 I have shown a filter bed comprising the tank indicated at 6, provided with a base 7 having a central supporting column 8 formed therewith. The bed 6 is preferably constructed of reinforced concrete or the like. Disposed within the bed 6, which is cylindrical in shape, I provide a filter bed of substantially uniform height, indicated generally by the reference numeral 9, and composed of relatively hard rocks, which rocks are of a size such that, in a preferred embodiment of the invention, they pass a two-inch screen and are retained upon a one-inch screen. The rock is carefully selected for hardness, and the individual particles thereof, when piled into the bed 6, provide a plurality of interstices therebetween through which the sewage liquor trickles as it is discharged by the rotary distributor.

The base of the distributor is mounted upon the supporting column 8, and comprises, preferably, a cast iron anchorage T 10 provided with a clean-out flange and also provided with a drain plug 12. The T 10 receives sewage from the sewage inlet pipe 13, which is connected thereto through the reducer 14, the sewage being pumped through the pipe 13 into the T 10, and thence into the distributor.

The distributor itself comprises a distributor manifold, shown in Figure 3 at 15, upon which is mounted the revolving drum 16 by means of the cap bolts 17 threaded into the upper flange of the manifold 15. The drum 16, at its upper end, supports the drive head 18 of the distributor, which drive head is aligned coaxially with the drum 16.

The manifold 15 is provided with oppositely extending outlet ports indicated at 19, to which are secured the distributor arms 20, the arms 20 being threaded into an annular flange plate 22 which is bolted, by bolts 23, to the flange at the outlet ports 19 of the manifold 15.

Extending upwardly from the vertically extending flange 24 of the T 10 is a supporting spool or column 25, which is secured to the flange 24 by means of the threaded flange plate 26 and the bolts 27. This spool or annular collar 25 may be of any desired vertical extent, depending upon the depth of the filter bed 9, and the height at which the distributor is to be supported above the upper surface of the bed. At its upper end, the spool 25 is provided with a threaded collar 28, which is adapted to have abutting engagement with a second threaded collar 29, the collars being secured together by bolts 30. Threaded into the collar 29 is a supporting column 32, which extends upwardly within the revolving drum 16, and at its upper end is threaded into an annular collar 33, the collar 33 being bolted to a bearing housing 34 mounted over the upper end of the column 32. The bearing housing 34 is provided with a flange portion 35 which extends within an annular flange 36 carried by the base 37 of the motor housing 18. Suitable packing or sealing means 38 is provided therebetween to prevent passage of foreign matter or grit into the bearing housing past the flange 35 and flange 36. The base 37 the motor housing is bolted, by bolts 39, to an inwardly extending flange 40 disposed at the upper end of the revolving drum 16.

The bearing housing 34 is provided with a central stud portion 42, which extends upwardly therefrom and forms a support upon which the bracket 43 of the motor 44 is mounted. The motor 44 is provided with speed reducing gearing 45 contained within the enclosed motor housing 18.

The stud portion 42 of the bearing housing 34 extends through a suitable opening formed in the base flange 37 of the housing 18, and suitable oil sealing means 46 is provided therebetween for preventing entry of foreign matter along the surface of the stud 42.

A suitable ball bearing member, indicated at 47, is interposed between the bearing housing 34 and a shoulder 48 formed on the base 37 of the motor housing 18. This bearing 47 supports the weight of the distributor upon the shoulder of the bearing housing 34, and thus upon the column 32 and spool 25, and thus upon the T 10 and supporting column 8. The bearing 47 is adapted to run in oil, there being oil disposed within the substantially cup-shaped bearing housing 34, which oil is prevented from leaking out by means of the sealing means 38 and 46. This sealing means comprises packing or the like disposed in wedge-shaped annular grooves adjacent the leakage surfaces, and, due to the relatively slow rotation of the drum 16 with respect to the column 32, substantially no entrance of foreign matter into the bearing housing occurs.

Referring now to the speed-reduction gearing 45, this gearing includes a vertically extending shaft 50, upon which is mounted, for free rotation with respect thereto, a pinion 52, which pinion has engagement with an internal ring gear 53 formed in the upper end of the driving head 18. A suitable cover plate 54 encloses the ring gear 53 and the upper end of the drive head and housing 18.

It will be noted that the power supply for the motor 44 is conducted through the submarine cable 105 upwardly through a central opening in the stud portion 42 of the bearing housing 34, and that its lower end is passed through the cable stuffing box 106, and downwardly through the bed 9 to a suitable source of power.

The shaft 50 also has keyed thereto a driving clutch member 55, which has dog tooth engagement, as shown at 56, with the pinion 52, whereby rotation in one direction of the shaft 50 will correspondingly rotate the clutch 56, and consequently will rotate the pinion 52 and the ring gear 53. However, rotation of the ring gear 53 in an opposite direction will result in slippage between the clutch 55 and the pinion 52, and consequently will produce no reverse rotation upon the shaft 50, which would be damaging in case worm gearing was employed in the speed reduction gearing 45. This free wheeling clutch engagement or drive provides for elimination of strains upon the gearing due to possible interruption of power and inadvertent reversal of direction of rotation of the drum 16.

Referring now in detail to the distributor arms, these arms extend radially outwardly of the manifold 15, and are provided, at spaced intervals, with wide non-clogging slots 60 milled in the bottom of the arms, as shown in detail in Figure 5. These slots or openings 60 are adapted to be covered, if desired, by cover plates 62 having slots 63 therein for sliding movement with respect to a bolt member 64 tapped into the pipe 20. Thus, by loosening the bolt member 64, the cover plate 62 may be slid over the opening 60 to close the same.

It will be noted that the openings 60, as shown in Figure 1, are spaced unequally from the manifold 15 in each of the pipes 20. This is for the purpose of providing uniform distribution of the liquor as it leaves the splash plate 65 and drops onto the surface of the filter bed 9.

Extending along the entire length of each of the arms 20 is a series of splash plates, indicated at 65, each of which is provided with a normally extending flange or lip portion 66 having a cushioning member 67 extending along the defining edge thereof, the member 67 being formed of rubber or the like. The plate 65 is secured to the pipe or distributor arm 20 by means of a bolt 68, which extends through a spacing bushing 69 and is tapped into the pipe 20. The bolt 68 enters the pipe at a slight angle, so that the splash plate 65 extends outwardly of the opening 60 at a slightly downwardly inclined angle with respect to the horizontal, so that liquor discharged through the opening 60 and spreading into a film over the splash plate 65 will be discharged from the plate 65 over the lower end thereof.

The drive head and motor housing 18, upon diametrically opposed sides thereof which are spaced 90° from the diametrically opposed portion 19 of the manifold 15, is provided with nodes or supporting bosses indicated at 70, which are adapted to provide supports for plate members 71, which plate members serve to support suitable guy rods or the like forming the truss structure which supports the arms 20. The guy rods are secured to the plates 71 in any desired manner, and these plates are free to rotate with respect to the supporting bosses 70, in order to provide for adjustment of the truss structure. Similarly, at the lower end of the revolving drum 16 and extending outwardly from the manifold 15, are a pair of supporting members or struts 72, which form bearings for the guy members 73 secured to and aligning the pipe 20 radially of the manifold 15.

It is thus apparent that the two diametrically opposed distributing arms are bolted to the manifold and are rigidly trussed in both planes, that is, the vertical and horizontal planes, by adjustable guy rods. The distributor can be furnished either with the conventional straight guy rods or with a curved top cord. The latter is not only pleasing to the eye, but also materially cuts down the vertical extent of the distributor itself. In this connection, it is to be noted that the head 18 for the rotating drum is a semi-steel casting, and is amply ribbed to cary all the loads transmitted by the guy rods.

In order to take care of any possible radial loads at the base of the distributor, I preferably provide four anti-friction roller bearings, indicated at 80, spaced about and engaging the outer peripheral surface of the annular collar 29. These roller bearings 80 are carried upon suitable spindles 82, which spindles are carried by the manifold, and are adjustable as to their center and radius of revolution. This adjustment may be provided by means of the adjusting screws 83, which shift the supporting brackets 84 and the spindles 82 laterally with respect to the collar 29.

It is desirable to provide for exact dynamic balance of the distributor, and for this purpose adjustable weighting of the distributor arms is provided for.

In addition, in order to prevent reverse rotation of the distributor when the power is cut off, I provide, adjacent the outer end of each of the arms 20, anchor rods indicated at 87, which anchor rods are rotatable in a vertical plane about pivots 88 carried by the clamping members 89 secured to the arms 20. The arms 87, when the distributor attempts to rotate in a direction opposite to that shown by the arrow in Figure 2, dig into the filter media in the bed 6, and prevent this reverse rotation of the distributor. This is especially advantageous if the distributor is placed in position where it is subjected to gusts of wind or the like, which would tend to impose severe stresses upon the shaft 50, pinion 52 and clutch 55.

Considering now the operation of the distributor and the circulation of sewage in the system, the sewage enters the anchorage T 10, and passes upwardly through the spool 25 and into the lower end of the supporting column 32. From the column 32, the sewage emerges into the rotating drum 16 and manifold 15 through slots or openings 90 formed in the column 32. Immediately below the slots 90 and extending about the column 32 is an inverted frusto-conical overflow flange, indicated in detail in Figure 4 by the reference numeral 92. The flange is provided with a recessed portion adapted to receive a sealing material 93 for sealing engagement with the outer peripheral surface of the column 32, and is adjusted vertically by means of the slot 94 through which the adjusting bolt 95 extends, the bolt 95 being tapped into the column 32.

At its outer end, the flange 92 is provided with a depending tongue portion 96, which tongue portion is adapted to extend into an annular groove 97 formed in a collar 98 fitted over the cylindrical member 99 which is threaded, at its lower end, into the base of the manifold 15 to define the manifold chamber or well 100.

The annular groove 97 is adapted to be partially filled with mercury or the like, indicated at 102, into which the depending tongue 96 extends. It is thus apparent that liquor passing out through the openings 90 in the column 32, and spilling over the flange 92 into the annular chamber 100 in the manifold 15, will, at no time, be capable of passing within the annular collar 99, and thence downwardly past the outer surface of the spool 25 into the filter bed. The mercury seal 102 effectively prevents any sewage liquor, regardless of the vertical extent to which it may rise within the well 100, from passing into the interior of the member 99. This seal therefore prevents short circuiting of the filter bed, and serves to force all liquor spilling into the well 100 to be distributed through the arms 20. The column 32 may be provided with additional openings below its upper end, as a precaution against any sewage liquor passing through stud 42 into the motor housing.

Referring now in detail to Figure 6, I have disclosed in this embodiment of my invention a driving structure which is of such design as to prevent disablement or breakdown of the driving means during initial starting of the distributor or upon stopping thereof. It is to be noted that because of the extremely long lever arm formed by each of the distributor arms, an extremely high leverage can be exerted upon the driving connections by a force exerted at the outer ends of the arms. For this reason it is necessary to provide relative slippage between the drum and the driving connections to accommodate any such stresses. The driving head 115 of this embodiment corresponds generally to the drive head 18 of Figure 3, and is secured in position upon the top of the column 32 in a manner similar to that described in connection with Figure 3. Extending centrally upwardly within the head 115 is a bearing member or stud 116 corresponding to the member 42 of Figure 3, which is preferably axially recessed to receive a shaft 117 carried by the driving means. Mounted at the upper end of the drum 115 is a suitable closure plate 118 having a central opening extending about any desired type of enclosed motor 119 mounted vertically within the drive head and extending outwardly of the plate 118 in order to provide for cooling thereof.

The motor 119 is connected in any suitable manner with the unit 120 of a heliocentric reduction drive indicated generally at 122. This drive may be of any well known type now on the market. If desired, any suitable type of reduction gearing may be employed in this connection. The reduction gearing 122 terminates in a drum 124 which is rotated at a constant speed through the reduction drive from the motor 119. This drum has its outer lateral surface finished as a brake surface, and is adapted to be engaged by braking surfaces formed upon two semi-circular brake shoes 125 and 126 which are disposed in engagement with the drum 124 and are provided with integrally formed web portions 127 engaging suitable thrust means 128 carried by the drum 115 for rotating the drum by means of the rotary driving force transmitted to the shoes 125 and 126 by the rotatable drum 124. Adjustable tensioning means, comprising bolt members 130 and nuts 132, with compression springs 133, are provided for coupling the brake shoes together, and may be adjustable in any predetermined manner to vary the frictional engagement of the shoes 125 and 126 with the drum 124.

Current for the motor 119 is led up through any suitable means, such as the cable 105 extending through a ribbed-out portion of the bearing 116 and connected to a pair of contact rings 134 and 135 mounted in insulated relationship upon the outer end of the bearing 116. Contact rings 134 and 135 are adapted to be engaged by suitable contact brush collectors 136 and 137 which engage the contact rings 134 and 135 and which in turn are connected through suitable conductors which lead upwardly through the drum 124 and associated drive assembly to the motor 119.

It is to be noted in this embodiment of the invention that upon initial actuation of the motor 119 the drum 124 is adapted to be driven at a predetermined constant speed determined by the reduction in drive through the unit 122. Due to the large static resistance of the rotary distributor, the shoes 125 and 126 will have an appreciable amount of slippage with respect to the rotating drum 124 during initial actuation of the motor. The thrust of these shoes upon the driving means 128 will slowly start to rotate the drum 115 and, as the static inertia of the distributor is reduced, the shoes 125 and 126 will continue to apply an increasing rotary force to the drum until the drum or drive head 115 is rotating at the speed of the drum 124. At this time the shoes lock with the drum 124, and the distributor is then rotated at a constant speed determined by the reduction in drive between the motor 119 and the drum 124. Thus there is no tendency for distortion, overstressing or disablement of any of the driving mechanism as the initial static load of the distributor is imposed upon the driving means. Further, when the motor is stopped, the slippage between the shoes 125—126 and the drum 124 will allow the distributor to continue in its rotation until this frictional resistance brings it to stationary position. This prevents any undue stresses being imposed upon the driving means during stopping of the distributor.

It is apparent that any other suitable means may be employed in place of the friction drum and shoes shown in this embodiment of the invention. By adjusting the bolts 132, any desired pressure of the shoes upon the drum may be provided, and the acceleration rate will thereby be increased or decreased. Thus the time interval of acceleration is lengthened to prevent overstressing of the driving connections due to the initial static resistance or inertia of the distributor. The driving ratio is thus automatically varied in accordance with the inertial resistance of the distributor.

Having described my invention in accordance with the patent statutes, what I claim as new and desire to secure by Letters Patent is:

1. In combination, a filter bed, a sewage inlet pipe extending into said bed, a vertically extending supporting pipe, a bearing at the upper end of said pipe, a rotary distributor supported on said bearing, electrical driving means supported on said bearing, non-reversible gearing between said driving means and said distributor, clutch means for driving said distributor in one direction and providing for free rotation of said distributor in the opposite direction, and submarine cable means extending through said bed and supporting pipe to said driving means for supplying electrical current to said driving means.

2. In a rotary distributor of the class described for spreading liquor over a filter bed, a revolving drum, distributor arms extending radially therefrom over said bed, means extending centrally of said bed for supporting said drum, said supporting means serving to conduct unfiltered liquor to said drum, electric driving means carried by said supporting means for rotating said drum, and submarine cable means extending through said bed and supporting means to said driving means for supplying electrical current thereto.

3. In combination, a rotary distributor, a central supporting column therefor, oil-sealed bearing means therebetween, a motor mounted on said column, driving means between said motor and distributor, and cable means extending upwardly through said column and bearing means to said motor for supplying electric current thereto.

4. In a rotary distributor of the class described, a revolving drum, a cylindrical driving head supported thereon, distributor arms extending radially outwardly from the lower end of said drum, vertically extending truss struts at spaced intervals on said arms, a truss structure for supporting said arms, studs projecting outwardly on opposite sides of said driving head, truss brackets pivotally supported on said studs and forming spaced central supports for said truss structure, tension members extending from said brackets to said arms and from said brackets to the upper ends of certain of said truss struts to brace said arms against lateral whipping during rotation of said drum, and strut members extending outwardly normal to said arms at the base of said drum and providing lateral truss supports for said arms.

5. In a rotary distributor of the class described having a driving head and a depending revolving drum, a manifold at the lower end of said drum, outwardly extending distributor arms carried by said manifold, supporting studs on said driving head, strut members extending laterally outwardly of said manifold intermediate said arms, strut members extending vertically upwardly at spaced intervals along said arms, and a truss structure supported on said studs and strut members for supporting said arms in both vertical and horizontal planes, said structure providing a curved top chord having a maximum height less than the spacing between said vertically extending strut members.

6. Means for spreading liquor discharged from spaced openings formed in the bottom of a tubular distributor arm comprising a substantially planar plate member having an angularly extending flange, cushioning means along the defining edge of said flange, and securing means supporting said plate and threading into said tubular member, said securing means mounting said plate in a slightly inclined plane extending downwardly away from said flange, said cushioning means engaging the outer periphery of said tubular member.

7. In a rotary distributor of the class described, a pair of oppositely extending distributor arms, clamp means mounted on said arms adjacent the outer ends thereof, horizontal pivots carried by said clamp means, and anchor bars supported at one end by said pivots and freely swingable in a vertical plane thereabout.

8. The combination with a filter bed having a rotary distributor mounted centrally thereof and provided with oppositely extending arms, of clamp means adjacent the extremities of each of said arms, pivots on said clamp means extending rearwardly of said arms, and anchor bars carried by said pivots and vertically swingable into and out of engagement with said bed.

9. In combination, a rotary distributor, a central supporting column therefor, motor means fixed on said column, and driving means mounted for driving reaction between said motor means and said distributor including a frictionally operated coupling between said driving means and said distributor for lengthening the time interval of acceleration and deceleration of said distributor upon initial starting and stopping of said motor.

10. In combination, a rotary distributor, a central supporting column therefor, and driving means disposed for driving reaction between said column and said distributor for driving said distributor and including means automatically varying the driving ratio in accordance with the inertial resistance of said distributor.

11. In combination, a rotory distributor, a central supporting column therefor, and driving means mounted on said column for driving said distributor and including means automatically varying the relative rate of rotation of the distributor with respect to the speed of said driving means.

12. In combination, a rotary distributor having a central rotatable drum, a central supporting column within said drum, and driving means on said column including a motor and friction clutch coupling means between said motor and said drum providing for overrunning movement of said driving means relative to said distributor during acceleration and for overrunning movement of said distributor relative to said drive means during deceleration.

13. In combination, a rotary distributor having a revolving drum and a pair of oppositely extending arms, a central stationary feed pipe forming a support therefor and having outlet means intermediate its ends for supplying liquor to said arms, drive means between the distributor and said feed pipe at the upper end thereof including friction controlled coupling means for lengthening the time interval of acceleration and deceleration of said distributor upon initial starting and stopping of rotation of said distributor, and motor means carried by said feed pipe and sealed from the interior thereof for actuating said driving means.

14. In combination, a rotary distributor, a central supporting column therefor, driving means between said column and said distributor for rotating said distributor in one direction, means in said driving means for accommodating relative movement of said distributor in the opposite direction, and motor means at the upper end of said column and enclosed within said distributor for actuating said driving means.

15. In combination, a rotary distributor having radially extending arms, a central supporting column therefor having bearing means at its upper end providing for rotation of said distributor on said column, and power operated driving means including a gear reduction means interposed between said distributor and the upper end of said column for rotating said distributor in one direction, said means providing for free movement of said distributor in the reverse direction, said central column having a feed connection and outlet means serving to supply liquor to the arms of said distributor.

16. In combination, a rotary distributor having laterally extending distributing arms and a central drum portion, a central feed pipe extending axially of said drum for supplying liquor through said drum to said arms, said pipe having bearing means at the upper end thereof supporting the weight of said distributor, a bearing surface about the lower end of said feed pipe, circumferentially spaced bearing means carried by said drum, means for adjusting said latter bearings with respect to said surface for maintaining axial alignment between said drum and feed pipe, and drive means reacting between said drum and feed pipe and including friction operating coupling means for accelerating rotation of said distributor in one direction in accordance with the inertial resistance of said distributor, said drive means providing for free relative movement of said distributor with respect to said feed pipe in the reverse direction.

JAMES DONALD WALKER.